United States Patent [19]

Kraft

[11] 4,109,542

[45] Aug. 29, 1978

[54] SPUN V-GROOVED SHEET METAL PULLEY WITH THICK HUB WALL INTEGRAL WITH THIN SIDE WALL

[75] Inventor: Derald H. Kraft, Canton, Ohio

[73] Assignee: Aspro, Inc., Canton, Ohio

[21] Appl. No.: 732,527

[22] Filed: Oct. 14, 1976

Related U.S. Application Data

[62] Division of Ser. No. 593,653, Jul. 7, 1975, Pat. No. 3,995,474.

[51] Int. Cl.$^2$ .................... F16H 55/44; F16H 55/36
[52] U.S. Cl. .................................. 74/230.8; 74/230.3
[58] Field of Search ............... 74/230.8, 230.3, 230.01, 74/230.05; 29/159 R; 72/83, 85

[56] References Cited

U.S. PATENT DOCUMENTS

| 2,696,740 | 12/1954 | Zatko | 74/230.8 |
|---|---|---|---|
| 2,929,345 | 3/1960 | Zatyko | 74/230.8 |
| 2,955,748 | 10/1960 | Killian | 74/230.8 UX |
| 3,046,924 | 7/1962 | Kane | 72/85 |
| 3,080,644 | 3/1963 | Previte et al. | 74/230.01 |
| 3,225,614 | 12/1965 | Skinner et al. | 74/230.01 |
| 3,282,076 | 11/1966 | Kaesemeyer | 29/159 R |
| 3,964,326 | 6/1976 | Mickus | 74/230.8 |
| 3,977,264 | 8/1976 | Sproul | 74/230.8 |
| 3,994,181 | 11/1976 | Sproul | 74/230.8 |
| 3,995,474 | 12/1976 | Kraft | 72/83 |
| 4,023,250 | 5/1977 | Sproul | 74/230.8 |
| 4,041,746 | 8/1977 | Kraft | 29/159 R |
| 4,050,321 | 9/1977 | Kraft | 74/230.8 |

FOREIGN PATENT DOCUMENTS

| 454,953 | 3/1949 | Canada | 74/230.8 |
|---|---|---|---|
| 1,089,468 | 11/1967 | United Kingdom | 74/230.8 |
| 625,768 | 7/1949 | United Kingdom | 74/230.8 |

Primary Examiner—Samuel Scott
Assistant Examiner—William R. Henderson
Attorney, Agent, or Firm—Frease & Bishop

[57] ABSTRACT

A method of making a dynamically balanced V-grooved sheet metal pulley from a flat sheet metal disc by roller spinning and splitting tools. The disc is provided with a central hole for mounting the disc on rotating die means between first headstock and tailstock die form assemblies of a spinning machine. The spinning tool presses the disc against an end of a headstock die form and moves generally radially outwardly pressing a portion of the die against the end of the die to provide a circular hub wall. The spinning tool then moves in a series of passes along the headstock die form thereby rolling, forming and ironing the rotating outer metal portions of the disc against the die and forming an axially extending cylindrical side wall terminating in a radially outwardly extending annular flange of a cup-shaped stage blank. The flange then is trimmed to a predetermined length and to form a peripheral axially extending edge on the flange. The cup-shaped blank then is transferred to and clamped between second headstock and tailstock die form assemblies. The clamped cup-shaped blank is rotated and splitting roll means splits the peripheral edge of the annular flange by exerting radial pressure thereon to form a rough V-shaped groove in the flange. Finishing roll means then move radially into the rough V-shaped groove and forms a finished V-shaped pulley groove. Alternately, the spinning tool may thin the metal in the cylindrical side wall during the forming of the cup-shaped stage blank, whereby the finished pulley has a thicker reinforced circular end wall for receiving a hub than the thinned cylindrical side wall.

6 Claims, 22 Drawing Figures

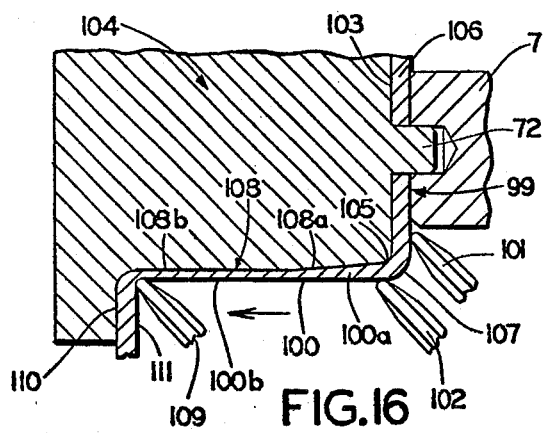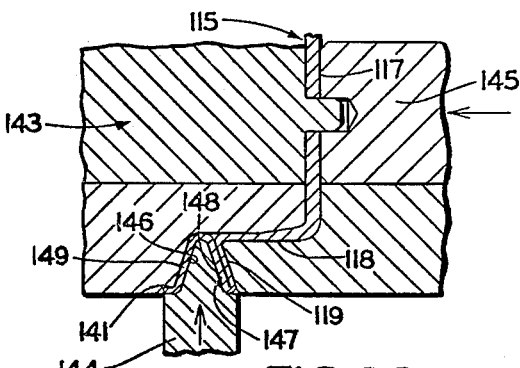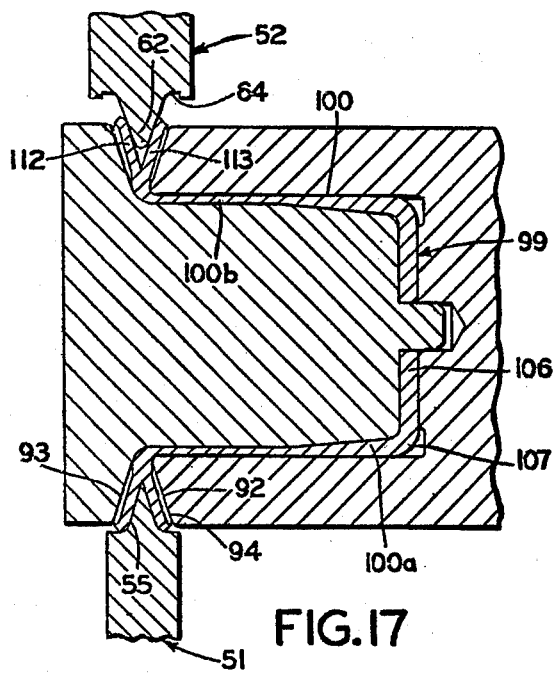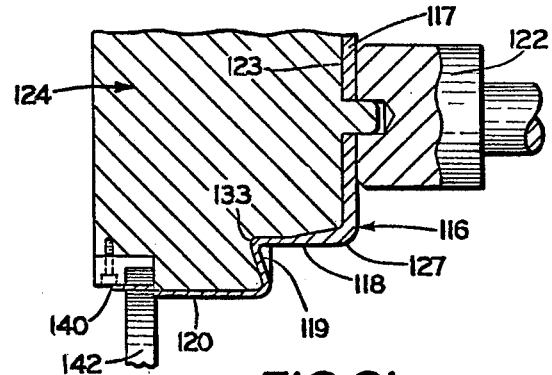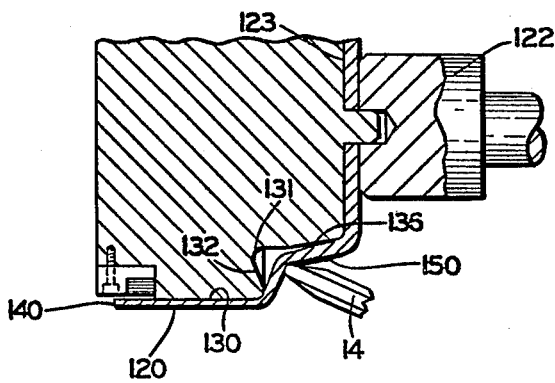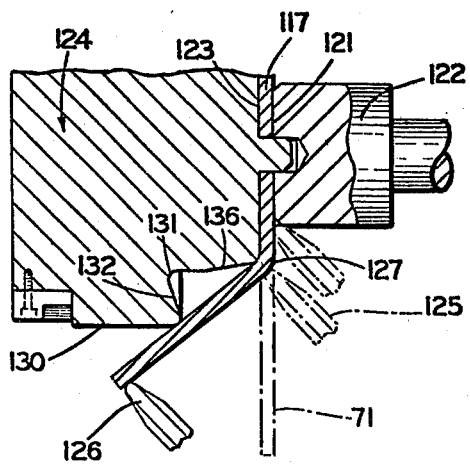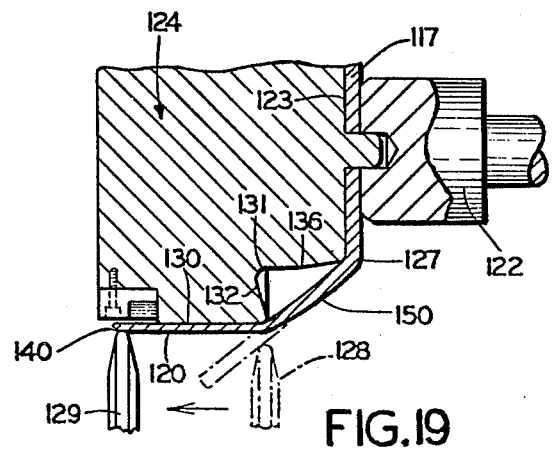

SPUN V-GROOVED SHEET METAL PULLEY WITH THICK HUB WALL INTEGRAL WITH THIN SIDE WALL

RELATED APPLICATION

This application is a division of my copending application Ser. No. 593,653, filed July 7, 1975 now U.S. Pat. No. 3,995,474, issued Dec. 7, 1976.

BACKGROUND OF THE INVENTION

1. Field of the Invention

The invention relates to a method of forming V-grooved sheet metal pulleys from flat sheet metal discs. More particularly, the invention relates to a method of roller spinning and splitting a dynamically balanced V-grooved pulley in which an annular radially extending flange is roller spun in a cup-shaped stage blank formed from the disc and substantially split to form the pulley V-groove. Furthermore, the produced pulley may be provided with a reinforced hub flange wall without attaching additional reinforcing means thereto, as heretofore required.

2. Description of the Prior Art

Many procedures have been used and are known for the formation of V-grooved sheet metal pulleys from flat sheet metal discs. Many of these procedures involve stamping and drawing operations to produce at least the cup-shaped blanks from which the V-grooved pulleys are subsequently roller spun. Examples of such stamping and drawing operations are shown in U.S. Pat. Nos. 2,493,053 and 3,080,644.

Finished V-grooved pulleys or the cup-shaped stage blanks for subsequent spinning into V-grooved pulleys which are produced by such prior stamping and drawing methods, are not balanced dynamically since the pulleys and blanks are formed by a series of progressive die steps on a non-rotating blank.

Other procedures and apparatus have been known for directly spinning cup blanks and V-grooved pulleys from flat metal discs for producing dynamically balanced pulleys, as shown in U.S. Pat. Nos. 1,680,061 and 1,728,002. The equipment and dies required, however, involves headstock dies with sliding and movable members which considerably increase the cost of pulley maufacture with such apparatus. Likewise, these dies require means on the machine for controlling movement of the die components which contribute to the increased costs and involve maintenance problems. Also, considerable tooling costs are involved to provide various dies from which to produce a variety of cup blanks, since a different die size and configuration is required for each type of cup blank produced.

Such prior art equipment and processes appear to be satisfactory for their intended use especially where vast quantities of cup-shaped blanks and finished spun products are made at high production rates. Such vast quantities spread the cost of the equipment, die and tooling which is expensive, over the large number of units produced. It is desirable in certain situations and locations to be able to produce a relatively small quantity of spun V-grooved pulleys directly from flat sheet metal discs with inexpensive, low volume producing equipment and methods. Furthermore, it is desirable to be able to change the size and configuration of the V-grooved pulley produced with a minimum tooling cost, so that small quantities of various sizes and configurations of pulleys can be produced by relatively low initial and replacement costs for equipment, tooling and dies.

One type of V-grooved pulley commonly produced by various stamping, drawing and spinning procedures and combinations thereof, has a flat bottom wall or hub flange portion which is connected with a generally cylindrical side wall, which in turn terminates in a pair of outwardly extending annular flanges to form the pulley V-groove. Heretofore, pulley constructions having such elongated cylindrical hub portions have been produced by roller spinning the V-groove in the generally cylindrical side wall, which has been formed by stamping and drawing procedures, as shown in U.S. Pat. No. 2,567,334.

Many applications using such elongated hubbed pulleys require a reinforced circular bottom wall for mounting a hub on the pulley, where the pulley will experience high torques and forces on the hub area. Prior pulley hub flange walls are reinforced by welding an outer concentric cup-shaped blank on the hub flange wall area of the pulley to increase the thickness of the hub flange wall without increasing the thickness of the cylindrical side wall where such reinforcement is not required. Other constructions such as shown in U.S. Pat. No. 2,729,110 telescopically secure a second cup-shaped blank within the main outer cup-shaped shell or blank to achieve the desired thickness. Various other known pulley constructions use an enlarged hub which forms the entire bottom wall of the pulley and is joined directly to the cylindrical side wall, as shown in U.S. Pat. No. 1,680,061.

Most of these prior pulley constructions having a reinforced hub area require additional components or procedures, such as welding, which increases the cost of the pulley.

Splitting of the disc-shaped blanks and of cup-shaped blanks is another procedure well known in the art of pulley manufacture to produce a V-grooved pulley, as shown in U.S. Pat. Nos. 1,555,771, 3,087,531 and 3,225,425. Pulleys produced by such known methods and procedures have no generally cylindrical side wall extending between the hub flange wall and the V-groove flanges when produced directly from a flat disc without previously working the same as shown in U.S. Pat. Nos. 1,555,771 and 3,225,425. Also, those pulley blanks having cylindrical side wall portions which terminate in outer annular flanges which are split to form a V-groove have been formed by stamping and drawing procedure, and have a cylindrical side wall thickness equal to the thickness of the hub flange wall. Such pulleys thus, may not be dynamically balanced and require additional manufacturing procedures and components to reinforce the hub flange wall, where the hub flange wall requires a greater thickness than the thickness of the cylindrical side wall.

No known method of which I am aware enables the production of relatively small quantities of various sizes and configurations of V-grooved pulleys by roller spinning and splitting flat sheet metal discs on usual and simple types of metal spinning machines; which V-grooved pulleys are dynamically balanced due to their complete formations by roller spinning and splitting; and in which the hub flange wall is connected to the V-groove by a generally cylindrical side wall which may be formed thinner than the hub flange wall permitting a pulley to be produced having a thick reinforced hub flange wall and thinner side wall without requiring additional components and manufacturing procedures and excess metal.

SUMMARY OF THE INVENTION

Objectives of the invention include providing new methods and procedures for the manufacture from a simple, single sheet metal blank, a dynamically balanced V-grooved sheet metal pulley having a flat bottom hub flange wall and a generally cylindrical side wall connecting the hub flange wall with the pulley V-groove; providing such a procedure which enables small quantities of such V-grooved pulleys to be produced on relatively inexpensive and simple lathe type metal spinning and splitting machines with a minimum of tooling costs, requiring basically a pair of headstock die forms having an outer configuration complementary to the internal shape of the pulley cylindrical side wall and hub flange wall, a pressure forming roller for laying the metal of a flat disc blank against the headstock die form during a series of passes of the roller with respect to the die form, and a splitting roller for separating a peripheral edge of an annular flange formed from the disc blank into a pair of converging flanges forming the V-groove of the pulley; providing such a procedure which requires only replacing the headstock die form of a spinning machine to make pulleys having various sizes and configurations of cylindrical side walls and flat hub flange walls, and which enables rapid and inexpensive changeover to produce such different pulleys; providing such a procedure which preferably may be automatically program controlled enabling an unskilld workman to operate a plurality of such metal spinning and splitting machines for carrying out the steps of the improved method; providing such a procedure which enables a V-grooved pulley to be formed having a thick reinforced hub flange wall with a thinner cylindrical side wall reducing the amount of metal required for formation of the pulley and eliminating additional components and procedures heretofore required to reinforce the hub flange wall; and providing a new procedure and method for making such dynamically balanced V-grooved pulleys having the pulley V-groove formed in an annular flange at the open end of a cylindrical side wall by splitting, which side wall and flange is formed by roller spinning from a disc shaped metal blank, which eliminates difficulties heretofore encountered, achieves the various objectives indicated in a practical, workable and easily controlled manner, and which solves problems and satisfies needs which have long existed in the art.

These objectives and advantages are obtained by the improved V-grooved pulley manufacture which produces a sheet metal pulley of the type having a bottom hub flange wall and a connected outer generally cylindrical side wall terminating in a pair of annular flanges extending outwardly of the cylindrical side wall and forming a V-groove therebetween, from a flat sheet metal disc including the steps of, providing a flat sheet metal disc having a central hole formed therein; clamping a central portion of the disc around the hole between opposed relatively axially movable complementary clamping faces of rotatable first headstock and tailstock die means wherein the first headstock die means also has cylindrical flange-forming means terminating in radially outwardly extending annular flange-forming means; rotating the first die means and clamped disc; pressure rolling, forming and ironing the rotating annular disc metal portions surrounding the central portion against the first headstock die means cylindrical and annular flange-forming means to form a cup-shaped stage blank with a flat bottom hub flange wall and a connected axially extending generally cylindrical side wall terminating in a radially outwardly extending annular flange having an extended end portion; trimming the extended end portion of the annular flange to a predetermined radial length with respect to the cylindrical side wall thereby forming an axially extending flat circumferential edge on the annular flange; removing the formed cup-shaped stage blank from the first die means; clamping the hub flange wall and connected cylindrical side wall of the cup-shaped stage blank between clamping surfaces of second headstock and tailstock die means, wherein said second headstock and tailstock die means includes conical surfaces forming a generally annular V-shaped die groove, and locating the annular stage blank flange within said die groove; rotating the second die means and clamped cup-shaped blank; splitting said annular flange to rough form a pair of annular angularly extending V-groove flanges of a V-shaped pulley groove by applying radial pressure to the flat circumferential edge of said annular flange with splitting roll means; and then roller forming a finished V-shaped pulley groove by pressure forming and ironing the rough formed V-groove flanges against its second die means conical surfaces.

BRIEF DESCRIPTION OF THE DRAWINGS

Preferred method steps of the invention - illustrative of the best mode in which applicant has contemplated applying the principles - are shown in the drawings and set forth in the following description, and are particularly and distinctly pointed out and set forth in the appended claims.

FIG. 16 is a fragmentary diagrammatic sectional view similar to FIG. 14 showing the steps of roller forming, ironing and thinning an intermediate portion of a metal disc to form a tapered thinned cylindrical side wall integrally connected to a thicker hub flange bottom wall;

FIG. 17 is a fragmentary diagrammatic sectional view similar to FIG. 15 of a headstock and tailstock die of a splitting machine upon completion of the splitting operation by a splitting roll, just prior to complete formation of the finished pulley V-groove by a finishing roll for the pulley blank shown in FIG. 16;

FIG. 18 is a diagrammatic fragmentary sectional view of a flat sheet metal blank disc clamped between a modified headstock die form and a tailstock die, showing the start of forming a modified cup-shaped pulley blank;

FIG. 19 is a view similar to FIG. 18 showing the steps of thinning and forming a cylindrical annular flange in the disc blank;

FIG. 20 is a view similar to FIGS. 18 and 19 showing another step of the improved roller spinning method showing the thinning and forming of a reentrant flange connecting the annular cylindrical flange with a reinforced hub bottom wall of the modified cup-shaped blank;

FIG. 21 is a view similar to FIGS. 18-20 showing a trimming operation being performed on the open end portion of the annular flange of the completed modified cup-shaped pulley blank; and FIG. 22 is a generally diagrammatic fragmentary view showing the formation of a pulley V-groove in the annular cylindrical flange wall of the modified cup-shaped metal blank having a reinforced bottom hub wall and thinned cylindrical side wall construction;

Similar numerals refer to similar parts throughout the drawings.

DESCRIPTION OF THE PREFERRED EMBODIMENT

Figure 1:
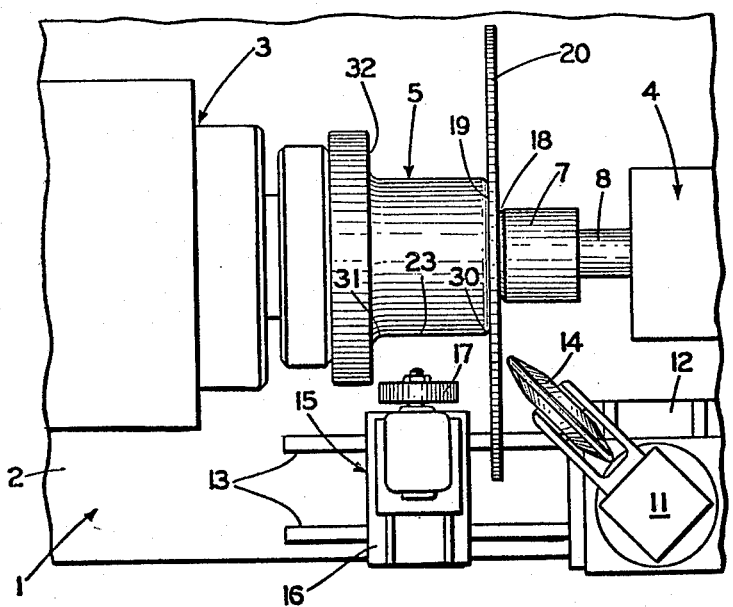
FIG. 1 is a fragmentary diagrammatic top plan view of portions of a type of simple spinning machine which may be used to carry out steps of the new procedure.

A portion of a typical simple lathe type spinning machine for carrying out certain of the steps of the improved roller forming and splitting method is shown in FIG. 1, and is indicated generally at 1. Spinner 1 includes a bed 2, a headstock assembly 3 and a tailstock assembly 4. A headstock die form 5 is mounted on headstock assembly 3 and is rotated by a motor driven shaft (not shown).

Figure 2:
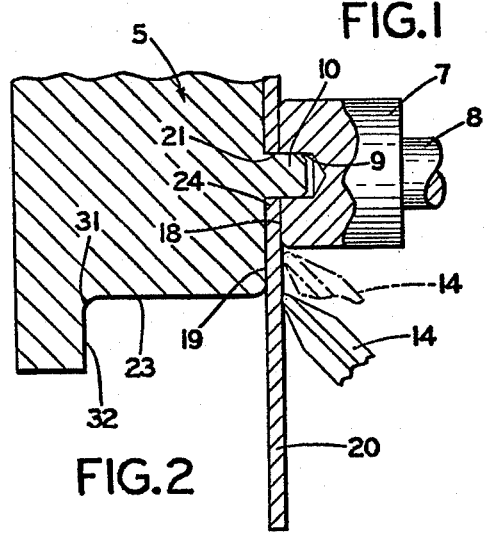
FIG. 2 is a somewhat diagrammatic fragmentary sectional view of a flat sheet metal blank disc mounted between headstock and tailstock dies of the spinning machine shown in FIG. 1, and showing the spinning of the flat bottom hub flange wall of the V-grooved pulley being produced by the improved procedures.
Figure 3:
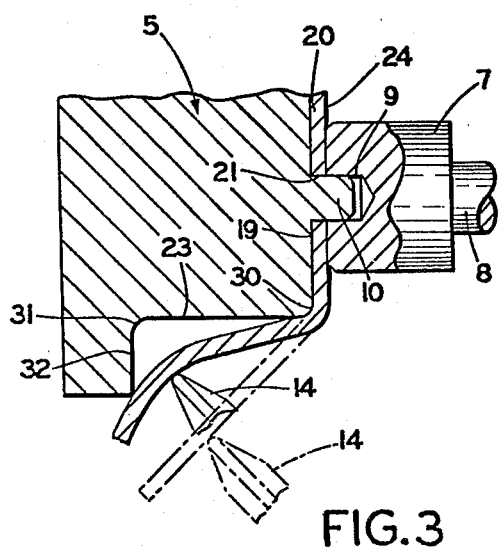
FIG. 3 is a view similar to FIG. 2 showing a step of the improved roller spinning operation in which an intermediate annular portion of the blank disc is being layed along the headstock die form preparatory to forming an outwardly radially extending flange.
Figure 8:
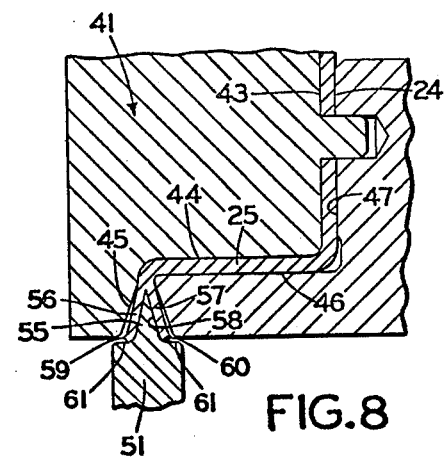
FIG. 8 is a view similar to FIG. 7 showing the splitting roll upon completion of the splitting operation performed on the annular flange producing a rough V-groove therein.

Tailstock assembly 4 preferably has a die form 7 axially movable by piston rod 8. An aperture 9 is formed in tailstock die 7 for receiving a pilot pin 10 formed on and extending axially outwardly from the center of headstock die 5 (FIG. 2).

A tool holder 11 is movably mounted on a cross feed carriage 12 which in turn is movably mounted on a pair of guide rods 13 for longitudinal axial movement between headstock 3 and tailstock 4. A pressure spinning roller 14 is rotatably mounted on tool holder 11 and is movable both in parallel and transverse directions with respect to the longitudinal axis of spinning machine 1 by manipulation along cross feed carriage 12 and guide rods 13.

A metal trimming wheel assembly 15 is mounted on a second cross feed carriage 16 which in turn is mounted on guide rods 13. Assembly 15 includes a trimming wheel 17 for trimming the edge portions of an annular flange formed on a cup-shaped stage blank produced in accordance with the procedures set forth below.

The particular construction and arrangement of roller spinning machine 1 and the components thereof, may be modified and changed without affecting the concepts of the invention. The important features brought out by the construction of machine 1 shown in FIG. 1, is the relative simplicity thereof in contrast with the known complex prior art spinning machines used for a variety of spinning procedures.

Figure 9:
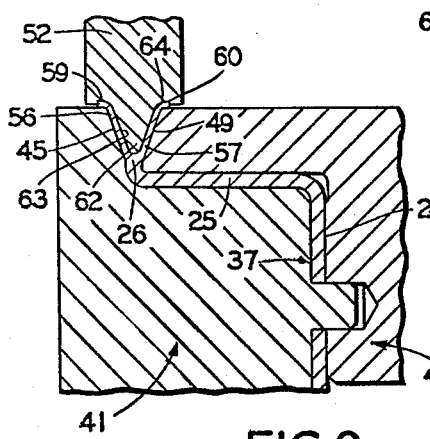
FIG. 9 is a somewhat similar view to FIGS. 7 and 8 showing a finishing roll completing the formation of the finished V-groove from the rough V-groove produced by the splitting roll of FIGS. 7 and 8.
Figure 10:
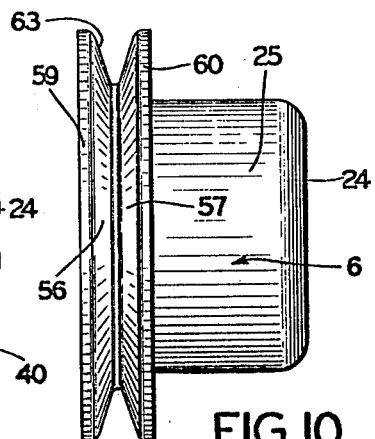
FIG. 10 is a side elevational view of a completed spun V-grooved pulley formed from the flat metal disc by the roll spinning and splitting steps shown in FIGS. 2-9.

The improved roller spinning procedures for producing a cup-shaped metal stage blank having an outturned annular flange for subsequent splitting and formation into a pulley V-groove, is set forth diagrammatically in FIGS. 2-5, with the splitting and V-groove forming procedures being shown in FIGS. 6-9. A spun metal V-grooved pulley produced by the steps of FIGS. 2-9 is shown in FIG. 10 and indicated at 6.

A flat sheet metal disc blank 20 is clamped between a circular end face 18 of tailstock die 7 and a larger circular flat face 19 of headstock die form 5 by actuation of a cylinder or the like controlling piston rod 8. Pilot pin 10 projects through a central hole 21 formed in disc 20 and into aperture 9 of tailstock die 7 to properly align and center disc 20 on headstock die 5 of spinning machine 1.

The tool or roller 14 is guided into contact with a central portion of rotating blank disc 20 which is adjacent to and surrounds tailstock die 7 as shown in dot-dash lines in FIG. 2 by the concurrent movement of cross carriage 12 and tool holder 11 until pressure is exerted on disc 20. Roller 14 then moves in a transversely, radially outwardly extending direction with respect to the longitudinal axis of machine 1 forcing the annular portion of disc 20 surrounding the clamped central portion against the outer periphery of flat end face 19 of die 5. Sufficient pressure is exerted by roller 14 on discs 20 during this outward radial movement to iron out any indentation, gauge variation or other irregularity of disc 20 without materially reducing the original thickness of disc 20, and to form the dynamically balanced central flat bottom hub flange wall 24 of a cup-shaped stage blank from which a final spun V-grooved pulley is produced.

Carriage 12 then moves longitudinally along guide rods 13 forwardly toward headstock die 5 simultaneously with the radially outward movement of tool holder 11. Roller 14 follows a general diagonal path pressing the unclamped outer portion of disc 20 to the position shown in dot-dash lines of FIG. 3. Roller 14 by a series of passes along and radially with respect to headstock die 5, works and forms this outer portion of disc 20 which surrounds the flat bottom flange wall 24 forwardly against a cylindrical flange forming wall 23 of the headstock die to start the formation of a complementary cylindrical side wall 25 of a pulley hub.

Figure 4:
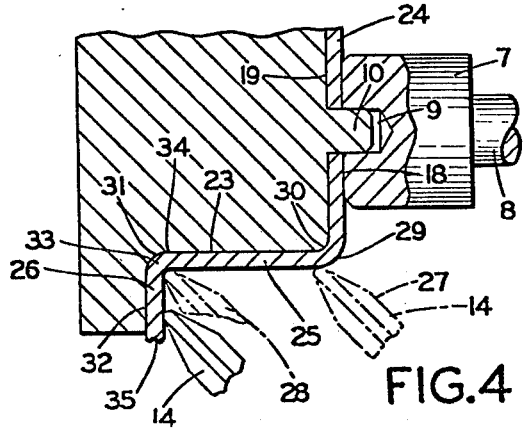
FIG. 4 is a view similar to FIGS. 2 and 3 showing the steps of completing the roller forming of the cylindrical hub side wall and annular flange in the disc blank.

In accordance with the invention, the next series of operations and steps of the improved process completes the formation of cylindrical hub side wall 25 and forms a radially outwardly extending annular flange 26 (FIG. 4). Roller 14 moves generally axially toward headstock die form 5 from the dot-dash line position indicated at 27 to the dot-dash line position 28. The roller forms and irons the metal of an intermediate portion of the disc along and against cylindrical flange forming side wall 23 of die 5. This metal working forms the axially extending cylindrical hub side wall 25 which is integrally connected to the hub flange wall 24 by a generally right angled corner 29. Corner 29 is complementary to a corresponding die corner 30 connecting headstock die face 19 with cylindrical die wall 23.

Roller 14 then forms, irons and presses a portion of the metal of disc 20 into a second right angled corner 31 formed in die form 5 which connects die cylindrical side wall 23 with a flange forming die wall 32 (FIG. 4). This working forms a complementary right angled corner 33 and the annular flange 26 in disc 20 adjacent cylindrical hub wall 25, with corner 33 connecting flange 26 with cylindrical hub wall 25 at a generally right angle. Flange 26 thus extends radially outwardly from cylindrical side wall 25 adjacent an open end 34 formed by side wall 25.

The next step involves the trimming of the extended somewhat irregular end 35 of annular flange 26 to a predetermined radial length with respect to cylindrical side wall 25. Trim assembly 15 moves axially toward headstock die form 5 on guide rods 13 (FIG. 5) with trimming wheel 17 forming a flat axially extending edge 36 on the outermost end of flange 26 upon removal of irregular end 35. This trimming operation completes the formation of a dynamically balanced cup-shaped stage blank indicated generally at 37, comprising flat circular hub flange wall 24, and cylindrical hub side wall 25 which is joined to flange wall 24 by right-angled corner 29. Cylindrical wall 25 terminates in radially outwardly extending annular flange 26, which in turn is connected by a second right-angled corner 33 to side wall 25.

Figure 6:
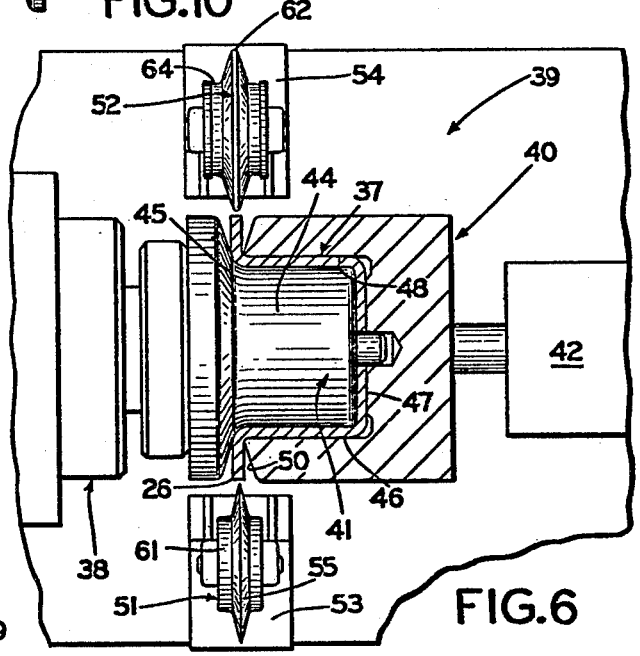
FIG. 6 is a fragmentary diagrammatic top plan view of portions of a simple lathe-type machine which may be used to carry out the splitting and V-groove forming steps of the new procedure.

The dynamically balanced cup-shaped stage blank 37 then may be removed either manually or automatically, from die 5 of spinning machine 1 and placed on a headstock die assembly 38 of a metal splitting machine, indicated generally at 39 (FIG. 6).

Splitting machine 39 has a simple lathe-type construction as does spinning machine 1, and includes headstock die assembly 38 and a tailstock die assembly 40. A headstock die form 41 is mounted on headstock assembly 38 and is rotated by a motor driven shaft as is headstock die form 5. A hydraulic or pneumatic operated piston mechanism 42 moves tailstock die assembly 40 axially with respect to headstock die assembly 38.

Headstock die form 41 (FIG. 7) includes a flat end face 43, a cylindrical side wall 44 and a conical annular flange 45. End face 43 and side wall 44 are similar to end face 19 and side wall 23 of die form 5 and are complementary to hub flange wall 24 and side wall 25 of stage blank 37. Tailstock die assembly 40 is formed with a generally cylindrical-shaped die cavity 46 (FIGS. 6–9) having a flat bottom wall 47 and a cylindrical side wall 48 complementary with hub flange wall 24 and cylindrical side wall 25 of cup-shaped blank 37. Die cavity side wall 48 terminates in an outturned rearwardly extending conical flange 49 which cooperates with conical flange 45 of headstock die 41 to form a V-shaped annular groove 50.

Splitting machine 39 (FIG. 6) has a splitting roll 51 and a V-groove forming roll 52 mounted on cross feed mechanisms 53 and 54, respectively, for transverse radial movement with respect to the longitudinal axis of splitting machine 39. Rolls 51 and 52 preferably are mounted diametrically opposite each other as shown in FIG. 6.

Figure 7:
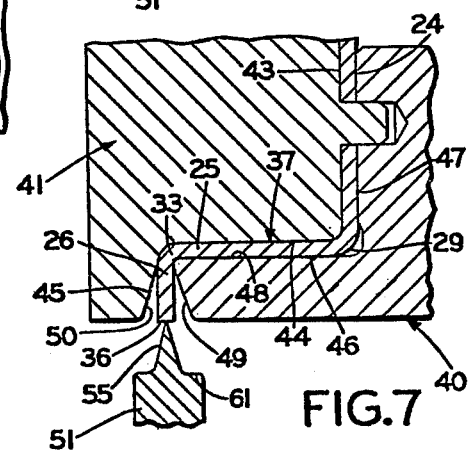
FIG. 7 is a somewhat diagrammatic fragmentary sectional view of the cup-shaped stage blank produced by the steps of FIGS. 1-5, mounted between headstock and tailstock dies of the machine shown in FIG. 6, and showing a splitting roll at an initial engagement position with a circumferential edge of the annular flange.

Stage blank 37 is clamped between headstock and tailstock die forms 41 and 40 as shown in FIGS. 6 and 7, with annular flange 26 being located within V-shaped groove 50. Clamped stage blank 37 then is rotated and splitting roll 51 is moved radially inwardly with its peripheral splitting edge 55 engaging the midpoint of circumferential edge 36 of trimmed flange 26. Roll 51, as it moves radially inwardly, splits flange 26 into a pair of angularly extending integrally connected V-groove flanges 56 and 57 (FIG. 8) which form a rough V-groove 58 therebetween. The outer ends of formed V-groove flanges 56 and 57 are flared slightly outwardly at 59 and 60, respectively, upon engagement with annular shoulders 61 formed on roll 51 adjacent splitting edge 55.

Forming roll 52 (FIG. 9) moves radially inwardly, generally simultaneously with the inward movement of splitting roll 51, with roll forming edge 62 entering the formed rough V-groove 58 with forming edge 62 just lagging splitting edge 55. Roll 52 forms, presses and irons flanges 56 and 57 against conical flanges 45 and 49 to provide a finished pulley V-groove 63 in flange 26. Shoulders 64, which are formed on roll 52 adjacent forming edge 62, shapes and forms flared ends 59 and 60 of V-groove flanges 56 and 57 upon forming edge 62 reaching its innermost position as shown in FIG. 9.

The finished spun V-grooved pulley 6 produced by the steps of the improved method shown in FIGS. 1–9 is shown in FIG. 10. Pulley 6 includes hub flange wall 24, and generally axially extending hub side wall 25 which terminates in the pair of V-groove flanges 56 and 57 forming pulley V-groove 63. Hub flange wall 24 and cylindrical hub side wall 25 preferably have a metal thickness equal to the thickness of disc blank 20 except for minor gauge variations and manufacturing tolerance, with flanges 56 and 57 each having an approximate thickness of one-half that of disc 20.

Figure 11:
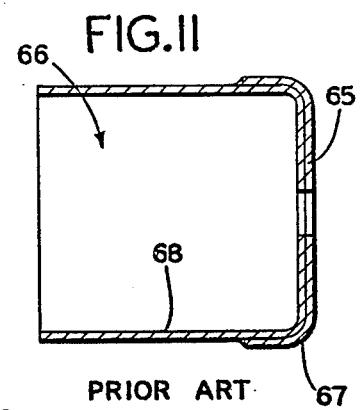
FIG. 11 is a sectional view of a type of prior art cup-shaped blank having a hub flange wall reinforcing cup blank attached thereto.

Many applications require a pulley having a generally elongated axially extending hub portion, similar to cylindrical side wall 25, with a thick reinforced hub flange wall 24, for attaching or mounting a hub thereon. Usually the cylindrical side wall need not be as thick as such a reinforced hub flange wall, thus resulting in excess metal and weight when the pulley is formed by known spinning and die stamping and drawing procedures. Alternately, a cup-shaped end cap 65 (FIG. 11) is welded to the exterior or interior of a usual cup-shaped blank 66 to reinforce the hub flange wall area 67 without increasing the thickness of cylindrical side wall 68, thereby increasing the pulley cost.

Figure 12:
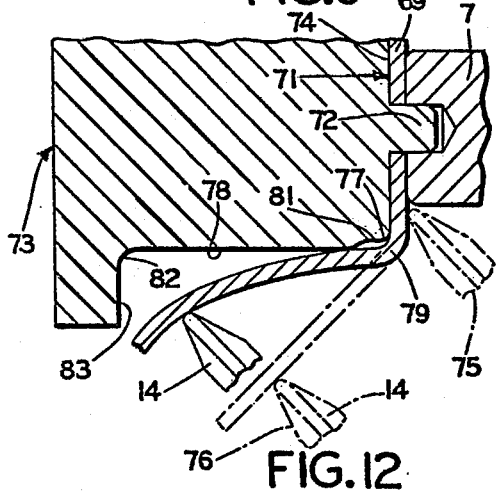
FIG. 12 is a somewhat diagrammatic fragmentary sectional view similar to FIGS. 2 and 3 showing a flat sheet metal disc mounted between headstock and tailstock dies of a spinning machine, with the headstock die forming the flat bottom hub flange wall and the remaining portion of the disc blank being formed about the headstock die cylindrical side wall in carrying out the steps of the improved method to form a modified V-groove pulley having a reinforced hub flange wall.

FIGS. 12-15 illustrate the spin forming and splitting of a modified V-grooved pulley similar to the pulley 6 of FIG. 10, but having a thicker reinforced hub flange wall 69 than a connected cylindrical hub side wall portion 70. A flat sheet metal disc 71, having a generally uniform metal thickness, as shown in FIG. 12, preferably of greater thickness than disc 20, is placed on a pilot pin 72 of a headstock die form 73. The central portion of disc 71 is clamped against a flat end face 74 of die form 73 by tailstock die 7.

Headstock and tailstock dies 73 and 7 are rotated and pressure-forming roller 14 is moved into pressure engagement with the unclamped portion of disc 71 adjacent tailstock die 7. Roller 14 moves generally radially outwardly and then simultaneously axially from the inner dot-dash line position 75 (FIG. 12) to the outer dot-dash line position 76 while pressure rolling, forming and ironing an annular metal portion of disc 71 against end face 74 and partially about die corner 77. Roller 14 then moves in a series of passes generally axially along a cylindrical side wall 78 of headstock die form 73 laying an intermediate annular metal portion of the disc generally along the cylindrical side wall portion 78, as shown in solid lines, FIG. 12. This metal working forms a right-angled corner 79 in the metallic disc complementary to die corner 77, and an annular cylindrically-shaped band or zone 80 adjacent corner 79. Annular band 80 preferably has the same metal thickness as hub flange end wall 69 and provides reinforcement for corner 79. Band 80 is formed by roller spinning of the metal into a complementary annular recess or relief 81 formed in die 73.

Figure 14:
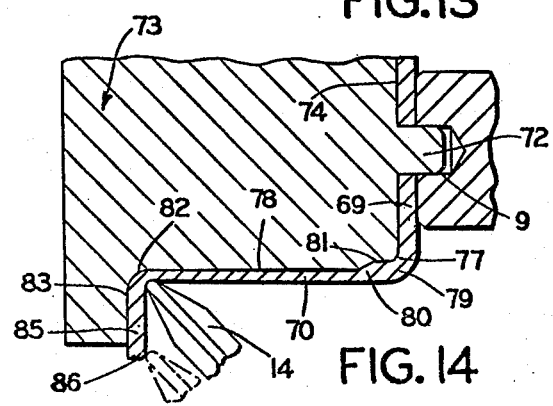
FIG. 14 is a view similar to FIGS. 12 and 13 showing completion of the steps of forming the thinned cylindrical side wall and annular flange of a cup-shaped stage blank.

In accordance with the invention, roller 14 then moves axially along headstock side wall 78 and pressure forms, irons and thins the metal of the intermediate annular portion against side wall 78 axially from annular band 80 to adjacent a flange forming die corner 82, similar to corner 31 of die 5 (FIG. 14). This thinning procedure forms the axially extending cylindrical side wall 70 somewhat similar to side wall 25 of cup-shaped blank 37. Roller 14 then moves radially outwardly forming and ironing an annular end portion of disc 71 against an annular flange forming surface 83 of die form 73 to form a radially outwardly extending annular flange 85, similar to flange 26 of stage blank 37.

Figure 5:
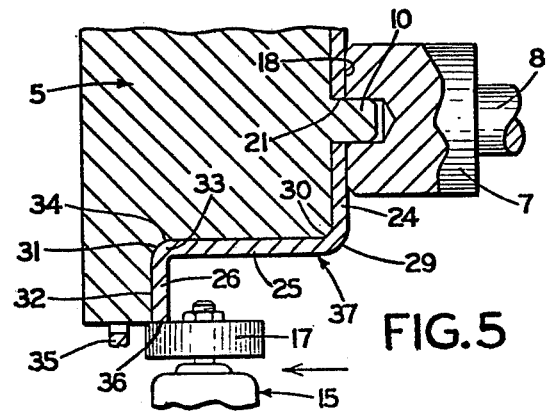
FIG. 5 is a view similar to FIGS. 2-4 showing a trimming operation being performed on the outer edge portion of the annular flange, completing formation of a cup-shaped stage blank.

An end portion 86 of flange 85 then is trimmed by wheel 17 in a similar manner as shown in FIG. 5, to provide flange 85 with a predetermined radial length for forming a pulley V-groove therein. The trimming operations also provides flange 85 with a flat axially extending circumferential edge (not shown) similar to edge 36 of flange 26.

Flange 85 preferably is not thinned when being worked by roller 14 (FIG. 14) as is side wall 70, and only is pressed and ironed against flange forming surface 83 to conform thereto and to remove any gauge variations, indentations and irregularities in the metal. Side wall 70 is thinned to a predetermined thickness, for example, one-half the thickness of disc 71 and of hub flange wall 69. The amount of thinning will be dependent upon the axial length of cylindrical die side wall 78 since as the metal is thinned, it is moved axially along side wall 78 toward flange forming surface 83 until the desired thickness is achieved. The remaining annular unworked section of original metal thickness then is laid against and formed along die flange surface 83 to form annular flange 85.

Figure 13:
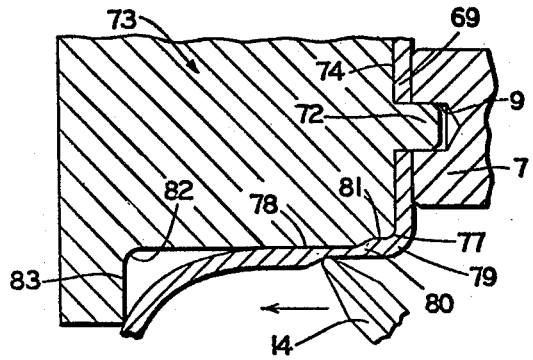
FIG. 13 is a view similar to FIG. 12 showing the initial steps of roller forming, ironing and thinning an intermediate steps of roller forming, ironing and thinning an intermediate annular portion of the metal disc to form a thinned cylindrical side wall integrally connected to a thickened hub flange wall.

The modified cup-shaped stage blank 87 produced by the steps of FIGS. 12-14, then is removed from headstock die form 73 of spinner 1 and placed on a modified headstock die form 88 mounted on splitting machine 39 (FIG. 15) or a similar lathe-type machine. A modified tailstock die 89 then clamps stage blank 87 on splitting machine 39. Headstock and tailstock dies 88 and 89 are similar to headstock and tailstock dies 41 and 40 except for the greater axial lengths of cylindrical side wall surfaces 90 and 91 of dies 88 and 89, respectively, which correspond to cylindrical side wall surfaces 44 and 48 of dies 41 and 40. An annular V-groove 92 is formed between conical surfaces 93 and 94 of dies 88 and 89 into which flange 85 extends when in clamped position, similar to V-groove 50 of FIG. 7.

Figure 15:
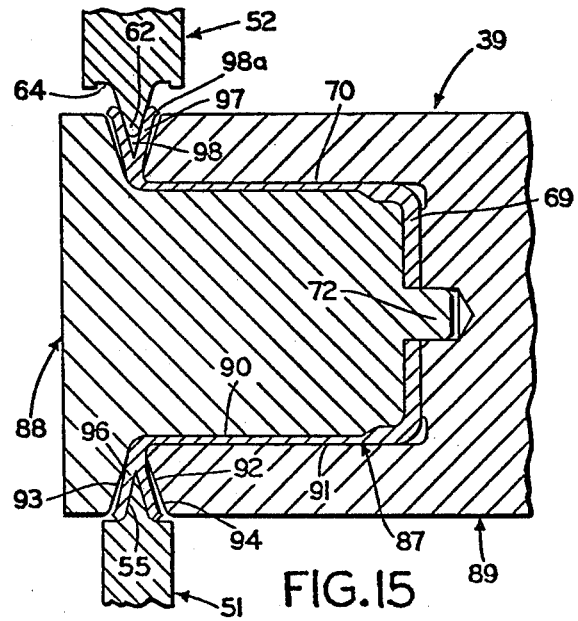
FIG. 15 is a fragmentary diagrammatic sectional view of the headstock and tailstock dies of a splitting machine similar to the machine of FIG. 6 upon completion of the splitting operation by a splitting roll and just prior to complete formation of the finished pulley V-groove by a finishing roll for the pulley construction shown in FIGS. 12-14.

Splitting roll 51 and finishing roll 52 then move radially inwardly forming a pair of V-groove flanges 96 and 97 defining a pulley V-groove 98 therebetween (FIG. 15). Flanges 96 and 97 preferably are formed with slightly flared ends 98a by splitting roll 51 which are finished by shoulders 64 on roll 52. Cylindrical side wall 70 of stage blank 87 may have the same axial length as side wall 25 of cup-shaped blank 37 merely by starting with a smaller diameter blank disc and thinning the metal sufficiently until the desired length is achieved.

Blank 87, thus provides a cup-shaped stage blank for subsequently forming pulley grooves in the cylindrical side wall which has a reinforced hub flange wall 69 of various desired thicknesses, which thickness preferably is equal to the thickness of the starting blank. One or more V-grooves also may be roller spun directly into the thinned side wall 70 of cup-shaped blank 87 and into side wall 25 of stage blank 37 by procedures described in U.S. Pat. Nos. 2,869,223 and 3,852,863.

Fundamental facets of the new concept involve the procedures for the spinning and subsequent splitting operations for the manufacture of a V-grooved pulley from a dynamically balanced cup-shaped pulley blank having an annular radially extending flange which is roller split to form a pulley V-groove; and in which the annular flange is connected to a flat hub flange wall by an axially extending side wall, which in turn may be thinned during its formation to provide a thicker reinforced hub flange wall eliminating excess wasted metal in the side wall.

A slightly modified form of the invention of FIGS. 12-15 is shown in FIGS. 16 and 17. In general, roller 14 pressure rolls, forms, irons, and thins an intermediate annular metal portion of disc blank 71 to form a thinned axially extending, generally cylindrical hub side wall 100 similar to side wall 70 of modified cup-shaped blank 87, in which the metal thickness of side wall 100 is tapered downwardly from a hub flange wall 106 towards an annular flange 111. This tapering spinning procedure forms further modified cup-shaped stage blank 99 similar to stage blank 87 except for tapered cylindrical hub wall 100 (FIG. 16).

Roller 14 moves generally radially outwardly and then axially from position 101 (FIG. 16) to position 102 while pressure rolling, forming and ironing an annular metal portion of disc 71 against end face 103 of headstock die form 104 and about die corner 105. This metal working forms hub flange wall 106 and a generally right-angled corner 107 in the metallic disc complementary to die end face 103 and corner 105, both of which have a metal thickness generally equal to that of starting disc blank 71.

Roller 14 continues to move in a series of passes generally axially along a tapered portion 108a and a cylindrical portion 108b of a side wall 108 of headstock die form 104 from position 102 to position 109 (FIG. 16) thinning and tapering the metal of an intermediate annular disc portion against side wall portions 108a and 108b toward a flange forming die shoulder 110. This metal working forms the generally axially extending side wall 100 consisting of a tapered portion 100a and a thinned cylindrical portion 100b. Side wall 100 is generally similar to side walls 25 and 70 of cup-shaped blanks 37 and 87, respectively, but having the tapered, thinned metal thickness portion 100a.

This tapering metal thickness in side wall 100 eliminates forming of the annular band 80 adjacent hub flange wall 69 of stage blank 87 to provide reinforcement for corner 79. This taper configuration provides additional metal in the areas of side wall 100 adjacent hub flange wall 106 without the excess metal in the side wall area adjacent the annular flange means from which a pair of V-groove flanges are to be formed. The outer diameter of side wall 100 preferably remains constant throughout the length thereof with the taper being provided in the side wall with respect to the inner diameter as shown in FIG. 16. If desired, the taper can be provided with respect to the outer diameter, with the inner diameter of side wall 100 remaining constant (not shown), or a combination thereof without departing from the concept of the invention.

Roller 14 then forms a radially outwardly extending flange 111 similar to flanges 26 and 85 at the thinned end of tapered side wall 100. Flange 111 preferably has a metal thickness equal to the thickness of the original disc blank and of hub flange wall 106.

FIG. 17 is similar to FIG. 15 and shows the steps of roller working annular flange 111 to form a pair of V-groove flanges 112 and 113 therein similar to V-groove flanges 96 and 97 of pulley V-groove 92, and thus need not be described in detail.

A still further modification of the invention is shown in FIGS. 18–22 wherein a spun metal V-grooved pulley 115 (FIG. 22) is produced from a spun metal cup-shaped stage blank 116 (FIG. 21). Stage blank 116 has a reinforced hub flange bottom wall 117, a generally cylindrical hub flange side wall 118, a reentrant conical flange 119, and a cylindrical annular flange wall 120. Conical flange 119 is roller formed in flat sheet metal disc blank 71 in a similar manner as described in my copending application, Ser. No. 584,388, filed June 6, 1975 now U.S. Pat. No. 3,991,598, issued Nov. 16, 1976.

Sheet metal disc blank 71 is clamped between die end face 121 of tailstock die 122 and a flat complementary end face 123 of headstock die form 124 (FIG. 18). Roller 14 preferably pressure forms, rolls and irons an annular portion of disc 71 surrounding the central clamped area against end face 123, forming hub flange bottom wall 117. This metal working maintains the general metal thickness of disc 71 upon forming bottom wall 117 to provide a reinforced thick hub flange wall for the spun V-grooved pulley 115. Sufficient pressure is exerted by roller 14 during this initial outward radial movement to iron out any indentation gauge variation or other irregularity of disc 71 without materially reducing the original metal thickness.

Roller 14 moves in a series of diagonally extending passes between the dot-dash line positions 125 and the full-line position 126 (FIG. 18) partially forming a corner 127 and laying an intermediate annular metal portion of disc 71 surrounding hub flange wall 117 generally along headstock die 124. Roller 14 then moves axially between dot-dash line position 128 and full-line position 129 (FIG. 19) forming, ironing, thinning and elongating the outer annular portion of the disc along and against a cylindrical side wall 130 of die 124. This metal working forms axially extending cylindrical annular flange wall 120 integrally connected to an intermediate annular metal disc portion 150 extending between hub flange bottom wall 117 and flange wall 120.

Roller 14 then forms, irons, thins and presses intermediate portion 150 of the metal disc into an acutely-angled corner 131 formed in die form 124 (FIG. 20) which connects a die hub side wall 136 with a reentrant conical flange forming die wall 132. This working forms a complementary acutely angled corner 133 (FIG. 21) between conical reentrant flange 119 and hub side wall 118 in disc 71, with corner 133 connecting hub wall 118 and reentrant flange 119 at an approximately 72° included angle.

In accordance with the invention, die hub side wall 136 is tapered, whereby the roller working of intermediate metal blank portion 150 thins and tapers the metal thickness of hub side wall 118 providing sufficient metal thickness adjacent corner 127 and hub bottom wall 117 for reinforcement, yet reducing the metal thickness adjacent conical flange 119.

The next step involves the trimming of the extended somewhat irregular end 140 of annular flange 120 which forms the cup end opening 141 to a predetermined axial length with respect to hub wall 118 by a trimming wheel 142. Trimming wheel 142 may be of the type described in U.S. Pat. No. 2,702,597.

The dynamically balanced cup-shaped blank 116 which is roller spun in accordance with the above described steps of the improved method, comprises the flat circular bottom hub wall 117 having a metal thickness generally equal to the thickness of the original disc blank 71. In accordance with the invention, hub side wall portion 118, reentrant flange 119 and annular flange wall 120 are elongated and thinned during the metal working thereof to provide cup-shaped blank 116 with a reinforced bottom hub wall 117 and thinned cylindrical side wall flange 120 connected thereto for forming a pair of pulley V-groove flanges. Likewise, hub side wall 118 may be tapered as shown in FIG. 21.

Cup-shaped blank 116 then is removed either manually or automatically from die 124 and placed on a pulley forming headstock die 143, a portion of which is shown in FIG. 22, which preferably is mounted on a second or different spinning machine.

A V-groove forming roll 144, or a plurality of rough and finishing pulley groove forming rolls of the type shown in U.S. Pat. No. 2,826,804 is moved transversely radially inwardly engaging the midpoint of thinned cylindrical flange wall 120 of pulley blank 116 (FIG. 22). Roll 144 in combination with the axial movement of a tailstock die assembly 145 forms a V-groove 146 in the annular flange wall. Reentrant flange 119 forms a double thickness flange wall 147 of V-groove 146 together with a matching second flange wall 148 formed from a portion of the metal of thinned flange wall 120. An opposite V-groove flange wall 149 also formed from flange wall 120 completes the forming of V-groove 146.

Spinning machine 1 and splitting machine 39 preferably will be controlled and programmed by pneumatic, hydraulic and electronic components and devices well known in the spinning machine art. An operator need only actuate a cycle start button causing tool holder 11 and trimming assembly 15 to advance through a programmed series of operations to completely spin form cup-shaped stage blanks 37, 87, 99 and 116. The spun stage blanks 37 and 87 then are removed and placed on splitting machine 39 which in turn may be automatically controlled and programmed to perform the splitting and finished V-groove forming procedures. Likewise, headstock die 5 need only be replaced by headstock dies 73, 104 and 124 with a subsequent reprogramming of the machine control cycle to change from production of pulley stage blanks 37 to stage blanks 87, 99 and 116.

Accordingly, the present invention provides substantial improvements in the art of making roller spun V-grooved pulleys of the type having a hub flange wall and an elongated axially extending side wall hub portion integrally connected thereto, which terminates in a pair of angled radially extending flanges forming a pulley V-groove therebetween; provides for the manufacture of such a statically and dynamically balanced concentric sheet metal V-grooved pulley in which the hub flange wall may have various thicknesses to provide the desired strength to meet various design criteria, which thickness preferably is equal to the thickness of the sheet metal blank disc from which it is formed, and in which the axially extending side wall may have a thickness less than that of the metal of the original blank disc to reduce the weight and material cost for such pulleys; and provides a method which satisfies the various objectives set forth, which solves problems and satisfies demands existing in the art, and which obtains the new results indicated.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described or to the exact pulley blank shape, dies, rolls and pulleys shown, since they may be varied to provide other structural embodiments.

Having now described the features, discoveries and principles of the invention, the manner in which the new roller spun V-grooved sheet metal pulleys may be manufactured, the details of the steps of improved method, and the advantageous, new and useful results obtained; the new and useful inventions, constructions, devices, parts, elements, arrangements, combinations, sub-combinations, methods, steps, procedures, operations, discoveries, principles and products are set forth in the appended claims.

I claim:

1. Spun V-grooved sheet metal pulley construction of the type having a cup shape provided with a flat circular hub wall of generally uniform metal thickness with a central opening formed in the hub wall for mounting a hub on the pulley, and a generally axially extending side wall integrally connected to the outer periphery of the hub wall and terminating in an integral pair of annular angularly extending V-groove flange walls forming a V-shaped pulley groove; the improvement in which the generally axially extending side wall has a metal thickness less than the metal thickness of the integrally connected hub wall to provide the pulley with a reinforced hub wall integral with the thinner side wall.

2. The pulley construction set forth in claim 1 in which the metal thickness of a portion of the side wall adjacent the hub wall is uniformly tapered toward the V-groove flanges, whereby said side wall has a greater metal thickness adjacent the hub wall than adjacent the V-groove flanges.

3. The pulley construction set forth in claim 1 in which the metal thickness of the side wall is generally uniform through the length of said side wall and is approximately one-half the metal thickness of the hub wall.

4. A spun V-grooved pulley construction of the type having a one-piece sheet metal cup shape with a hub wall and an annular side wall terminating in an open end; the annular side wall having a metal thickness less than the metal thickness of the hub wall; annular V-groove-forming walls integrally connected to the side wall at its open end; and the thickness of the hub wall being greater than the thickness of at least one of the V-groove-forming walls.

5. The pulley defined in claim 4 in which the thickness of the hub wall is greater than the total thickness of both V-groove-forming walls.

6. The pulley defined in claim 4 in which the thickness of the hub wall is equal to the total thickness of both V-groove-forming walls.

* * * * *

UNITED STATES PATENT AND TRADEMARK OFFICE
CERTIFICATE OF CORRECTION

PATENT NO. : 4,109,542

DATED : August 29, 1978

INVENTOR(S) : Derald H. Kraft

It is certified that error appears in the above-identified patent and that said Letters Patent are hereby corrected as shown below:

Column 1, line 18 - change "substantially" to - subsequently -

Column 2, line 11 - change "has" to - had -

Column 3, line 19 - change "roller" to - roll -

Column 3, line 29 - change "unskilld" to - unskilled -

Column 5, line 21 - delete "an intermediate steps of roller forming, ironing and thinning"

Signed and Sealed this

Thirteenth Day of February 1979

[SEAL]

Attest:

RUTH C. MASON
Attesting Officer

DONALD W. BANNER
Commissioner of Patents and Trademarks